(12) United States Patent
Miyoshi

(10) Patent No.: US 7,165,661 B2
(45) Date of Patent: Jan. 23, 2007

(54) BAG MOUNTED WITH CASTERS

(75) Inventor: Etsuo Miyoshi, Higashikagawa (JP)

(73) Assignee: Swany Corporation, Kagawa (JP)

( * ) Notice: Subject to any disclaimer, the term of this patent is extended or adjusted under 35 U.S.C. 154(b) by 235 days.

(21) Appl. No.: 10/849,012

(22) Filed: May 20, 2004

(65) Prior Publication Data
US 2004/0231939 A1    Nov. 25, 2004

(30) Foreign Application Priority Data
May 21, 2003   (JP)   ............... 2003-144194

(51) Int. Cl.
*A45C 9/00*    (2006.01)
*A45C 5/14*    (2006.01)
*A45C 13/26*   (2006.01)

(52) U.S. Cl. .............. 190/8; 190/15.1; 190/18 A; 190/39; 190/115; 16/113.1; 280/37; 280/655.1

(58) Field of Classification Search ............ 190/8, 190/15.1, 18 A, 39, 115, 12 A; 16/113.1; 280/47.29, 655.1
See application file for complete search history.

(56) References Cited

U.S. PATENT DOCUMENTS

| 1,099,933 | A | * | 6/1914 | Pohrer ............... 280/47.17 |
| 1,757,490 | A | * | 5/1930 | Tibbetts ............... 410/51 |
| 3,522,955 | A | | 8/1970 | Warner |
| 3,693,994 | A | * | 9/1972 | Wilson ............... 280/651 |
| 4,032,165 | A | | 6/1977 | Russell |
| 4,165,088 | A | | 8/1979 | Nelson |
| 4,619,464 | A | * | 10/1986 | Hwang ............... 280/655 |
| 4,995,487 | A | | 2/1991 | Plath ............... 190/184 |
| 5,374,073 | A | | 12/1994 | Hung-Hsin ............... 280/30 |
| 5,377,795 | A | * | 1/1995 | Berman ............... 190/18 A |
| 5,407,040 | A | * | 4/1995 | Hu ............... 190/100 |
| 5,727,898 | A | | 3/1998 | Lu ............... 16/115 X |
| 5,732,443 | A | | 3/1998 | Kazmark, Jr. et al. |
| 5,762,168 | A | | 6/1998 | Miyoshi |
| 5,806,143 | A | | 9/1998 | Tsai |
| 5,908,093 | A | | 6/1999 | Miyoshi ............... 190/115 |
| 5,943,936 | A | * | 8/1999 | Deliman et al. ............... 190/115 |

(Continued)

FOREIGN PATENT DOCUMENTS

DE           724 699           9/1942

(Continued)

*Primary Examiner*—Sue A. Weaver
(74) *Attorney, Agent, or Firm*—Wenderoth, Lind & Ponack, L.L.P.

(57) ABSTRACT

A bag mounted with casters has a bag body attached to a base frame mounted with the casters at four corners of a bottom surface thereof. The base frame includes a loading table, and vertically extensible rods with a grip mounted at upper ends thereof. The extensible rods are fixed on one side of the loading table so as to stand on their own. Further, when the grip is raised, the extensible rods are curved or tilted so that the grip moves toward the middle of the loading table. The extensible rods are secured at a position in a retracted state by stoppers so that the grip is positioned at an upper portion of the bag body or above the bag body, and are secured at a position by the stoppers in an extended state so that a height of the grip from the bottoms of the casters is in a range of 60 to 100 cm.

20 Claims, 11 Drawing Sheets

U.S. PATENT DOCUMENTS

| | | | |
|---|---|---|---|
| 5,950,779 A * | 9/1999 | Miyoshi | 190/18 A |
| 6,024,376 A | 2/2000 | Golichowski et al. | |
| 6,026,542 A * | 2/2000 | Lu | 16/113.1 |
| 6,032,966 A | 3/2000 | Young | |
| 2003/0127296 A1 * | 7/2003 | Saetia | 190/18 A |
| 2003/0184034 A1 * | 10/2003 | Pfeiffer | 280/47.29 |
| 2003/0197340 A1 * | 10/2003 | Udall et al. | 280/47.27 |
| 2004/0178035 A1 * | 9/2004 | Wu | 190/115 |
| 2004/0231939 A1 | 11/2004 | Miyoshi | |

FOREIGN PATENT DOCUMENTS

| | | |
|---|---|---|
| DE | 29614662 U1 * | 7/1997 |
| DE | 100 33 698 | 5/2002 |
| DE | 10033698 | 5/2002 |
| EP | 1 407 749 | 4/2004 |
| FR | 2612476 | 9/1988 |
| FR | 2696929 | 4/1994 |
| FR | 2 722 667 | 1/1996 |
| GB | 2 347 341 | 9/2000 |
| JP | 57-179824 | 11/1982 |
| JP | 10-137022 | 5/1988 |
| JP | 63-131634 | 8/1988 |
| JP | 4-76686 | 12/1992 |
| JP | 9-38161 | 2/1997 |
| JP | 10-86824 | 4/1998 |

* cited by examiner

BAG MOUNTED WITH CASTERS

BACKGROUND OF THE INVENTION

1. Field of the Invention

The present invention relates to a bag mounted with casters, and particularly to a bag having a handle that can vertically move.

2. Discussion of the Related

Bags provided with casters and a freely extensible handle have already been developed and widely used. There are many bags of this structure which are sized to allow the bag to be boarded on planes or the bag may be of a somewhat larger size. For example, bags of this structure have been mentioned in U.S. Pat. No. 4,995,487 (Patent Reference 1); Japanese Patent Publication 4-76686 (Patent Reference 2) issued Dec. 4, 1992; Japanese non-examined Utility Model Publication No. 57-179824 (Patent Reference 3) issued Nov. 15, 1982 and Japanese non-examined Utility Model Publication No. 63-131634 (Patent Reference 4) issued Aug. 29, 1988. The bags mentioned in these publications are provided with two casters 141 mounted on one side of a bottom face of the bags as shown in FIG. 1. A pair of short legs 142 is fixed on the opposite side of the bottom face with respect to the casters 141. When the bag is in a vertical orientation, the casters 141 and the legs 142 are in contact with the floor. In this condition, because the legs 142 do not turn and are in contact with the floor, the bag can stand upright without moving. Further, an extensible handle 143 is provided at an upper face of the bag to allow the bag to be pulled. The casters 141 are mounted on the same side of the bag as the handle 143 because the bag is pulled while in a slanted or a tilted orientation.

As shown in FIG. 1, the bag can be moved when it is tilted and pulled by the handle 143. When the bag is tilted, the casters 141 remain in contact with the floor and the legs 142 leave the floor. When the handle 143 is pulled in this condition, the casters 141 turn thereby making the bag easy to move. However, with the bags that move in this fashion, the casters 141 cannot sometimes be used in narrow places such as in the inside of a plane cabin or in a crowded area. Therefore, the bag cannot be moved freely with casters 141 in the aisles between the seats in the cabin of a plane, or in crowded areas. When the casters 141 cannot be used, it is necessary to lift the bag and to carry it by hand. In order to prevent the width of the bag from being wide, when the bag is lifted up and carried by hand, it is then possible to move the bag in the direction shown by arrow A in FIG. 1.

The bag mounted with casters has a convenient structure which allows heavy bags to be moved easily. This is because even if the bag is heavy, it can be pulled easily while rolling on the casters. In order to solve the drawbacks of the prior art, the present inventor has developed the bag structure shown in FIG. 2. The bag shown in FIG. 2 has casters 241 fixed at the bottom face of bag body 244. To allow the bag body 244 to stand by itself in an upright position, the casters 241 are mounted at the four corners of the bottom face, respectively. A grip 243A of a handle 243 is located at the middle between the right and left sides of the upper face of the bag body 244. In contrast to the bag shown in FIG. 1, the bag shown in FIG. 2 can be moved, not by tilting the bag body, but with the bag body standing in a vertical position as shown by the arrow in the FIG. 2. When it is moved in the direction shown by the arrow, it can be moved with a narrow width of the bag body oriented perpendicular to the direction of travel. For this reason, the bag shown in FIG. 2 has the advantage that it can be conveniently moved in plane cabins or crowded areas. Furthermore, the bag can be freely moved in any direction by using free casters in an upright position, which swivel in any direction, for the four casters 241. Also, the upright bag does not transmit the bag weight to the handle 243. Therefore, even a fairly heavy bag can be easily pushed and moved.

The bag of this structure can be lightly and easily moved on its four casters by pushing the grip of the handle. However, with a bag of this structure it is necessary to place the grip of the handle at the middle of the bag body, i.e. between the right and the left sides of the bag body. If a grip is fixed to one side of the bag body having free swiveling casters, it is difficult to move the bag in a straight direction by pushing the grip.

As shown in the cross sectional view of FIG. 3, with the bag mounted with the handle at the middle of the upper face of the bag body, it is necessary to fix extensible rods 245 of the handle 243 to the inside of the bag body 244. To place the grip 243A at the middle between the right and left sides of the bag body 244, the efficient use of the inside of the bag body 244 difficult. To solve as much as possible the problems associated with the extensible rods 245, the present inventor has provided a partition panel 246 in the bag body 244 and thus has invented a bag with the extensible rods 245 fixed to this partition panel 246. The bag is designed to open on both sides so as to allow items to be placed in the bag on both sides of the partition 246. In the bag of this structure, the partition panel 246 reinforces the bag body 244 and also divides the bag body 244 into two compartments thereby making the bag more convenient. However, the drawback of having the extensible rods 245 hindering inside the bag body 244 is still not solved. Especially, the drawback of the bag body 244 becoming shallower, thus preventing the placement of thick items therein, cannot be solved.

To solve these drawbacks, the present inventor has developed a bag shown in FIG. 4 (See Patent Reference 5).

This bag has a case body 344 mounted with casters 341 at four corners, and further has extensible rods 345 fixed on a side surface of the bag body 344. The extensible rods 345 have a structure capable of extending a handle 343, and a grip 343A is connected to upper ends thereof. In the condition where the extensible rods 345 are pulled up from the bag body 344, the extensible rods 345 are curved so that the grip 343A is located at the middle between the right and left sides of an upper surface the bag body 344.

Patent Reference 1: U.S. Pat. No. 4,995,487

Patent Reference 2: Japanese Patent Publication 4-76686

Patent Reference 3: Japanese non-examined Utility Model Publication No. 57-179824

Patent Reference 4: Japanese non-examined Utility Model Publication No. 63-131634

Patent Reference 5: Japanese non-examined Patent Publication No. 10-137022

In the bag of this structure, since the extensible rods are fixed on the side surface, the bag has a feature that can form an interior of the bag body deeply. However, in the bag of this structure, the extensible rods are fixed on the bag body, therefore, the bag body is required to have a rigid structure. The reason is that the bag body allows the extensible rods to stand on their own. Especially, in a bag having casters mounted at the four corners whereby being freely moved on a horizontal plane in any moving directions, extensible rods fixed to a bag body whereby standing on their own, and a grip of the rods with the height of 60 to 100 cm, the bag can be used as a walking stick to move by pushing the bag when a user walk with gripping the grip. In the bag of this structure, the bag is moved not by pulling the extensible rods as shown in FIG. 1, but by pushing them forwardly to move the bag body as a walking stick for supporting a walker. Thus, the bag is required to have a rigid structure so that it does not fall down when pushed. Accordingly, in order to achieve a rigid structure so that it does not fall down when pushed, mount portions of the bag and the rods should be sufficiently reinforced. Therefore, such a bag has a drawback that complex structure of the bag body causes an extremely high manufacturing cost. Further, it has another drawback that is difficult to reinforce Accordingly, in order to achieve a rigid structure so that it does not fall down when pushed, mount portions of the bag and the rods should be sufficiently reinforced. Therefore, such a bag has a drawback that complex structure of the bag body causes an extremely high manufacturing cost. Further, it has another drawback that is difficult to reinforce the bag body without reducing its storage space.

The present invention has been made to further solve these drawbacks. An important object of the present invention is to provide a bag mounted with casters having a bag body constructed of a simple structure capable of being manufactured inexpensively, and further capable of being easily moved forward while standing on its own for use as a walking stick by gripping a grip disposed at an upper end.

The above and further objects and features of the invention will more fully be apparent from the following detailed description with accompanying drawings.

SUMMARY OF INVENTION

A bag mounted with casters according to the present invention comprises a base frame including a loading table mounted with the casters capable of being freely moved on a horizontal plane in any moving direction mounted at four corners of the loading table, extensible rods upwardly extending from and fixed on one side of the loading table so as to stand on their own, the extensible rods having a grip disposed on upper ends thereof, and stoppers securing the extensible rods at an extended position and a retracted position; and a bag body fixed on side surfaces of the extensible rods on or above the loading table.

Further, in the bag mounted with casters according to the present invention, the extensible rods are curved so that the grip moves from the one side of the loading table, on which the extensible rods are fixed, toward the middle of the loading table when the grip is raised by extending the extensible rods. The extensible rods are secured in a retracted state by the stoppers so that the grip is positioned at an upper portion of the bag body or above the bag body, and are secured in an extended state by the stoppers so that a height of the grip from the bottoms of the casters is in a range of 60 to 100 cm.

Further, the bag mounted with casters according to the present invention may have a structure in which the extensible rods are tilted and connected to the loading table so that the grip moves from the one side of the loading table, on which the extensible rods are fixed, toward the middle of the loading table when the grip is raised by extending the extensible rods. The extensible rods are secured in a retracted state by the stoppers so that the grip is positioned at an upper portion of the bag body or above the bag body, and are secured in an extended state by the stoppers so that a height of the grip from the bottoms of the casters is in a range of 60 to 100 cm.

The bag mounted with casters of the above structure has a feature that has a bag body of a simple structure capable of being manufactured inexpensively, and further capable of being easily moved forward while standing on its own for use as a walking stick by gripping a grip disposed at an upper end. The reason is that the bag comprises the base frame mounted with the casters at four corners of the bottom thereof, and the bag body is attached to the base frame. The base frame includes the extensible rods upwardly extending from and fixed on one side of the loading table so as to stand on their own, and the extensible rods are curved or tilted so that the grip moves from the one side of the loading table, on which the extensible rods are fixed, toward the middle of the loading table when the grip is raised by extending the extensible rods.

Especially, in the bag according to the present invention, the extensible rods stand on their own not by being supported by a bag body as in a conventional bag but by being fixed on the loading table. For this reason, a material, a shape, and a structure of the bag body are not restricted in order to allow the extensible rods to stand on their own. In other words, the bag body can be a simple structure, and thus can be manufactured inexpensively. In particular, a structure in which the bag body is made of a flexible sheet by sewing can achieve weight reduction of the whole bag.

Further, in the above bag, since the extensible rods are fixed on the loading table so as to stand on their own as the base frame. The extensible rods stably stand on their own even in the state where the grip is raised by extending the extensible rods, and thus it is possible to achieve a tough structure that does not fall down. Accordingly, the bag can be used as a walking stick that can move by pushing the bag when a user walks while gripping the grip in the state where the grip is raised. Particularly, a structure in which the loading table and the extensible rods are connected by reinforcing walls has a feature that can reinforce a connection portion between the loading table and the extensible rods, and thus, the extensible rods can stand on their own more stably.

Further, in the above bag, since the grip at the upper portions of the extensible rods is located in the middle of the loading table in the state where the extensible rods are extended, the bag has a feature that has an excellent moving directivity without winding when moved by pushing the bag while gripping the grip.

The bag body may be made by sewing a flexible sheet and can be detachably attached to the base frame. The extensible rods may include guide tubes, which vertically extend from and are fixed on the loading table, and sliding rods, which are inserted into the guide tubes, and are thereby telescoping, and the grip is fixed at upper ends of the sliding rods.

In the base frame, two extensible rods may be fixed on the one side of the loading table, and the grip may be connected to the upper ends of the two extensible rods. A connecting rod may be connected between upper ends of guide tubes included by the two extensible rods. In addition, the two extensible rods may be fixed on both ends of the one side of the loading table.

Further, in the base frame, the loading table and the extensible rods may be connected by reinforcing walls, and the bag body may be attached to an area surrounded by the reinforcing walls and the extensible rods. The base frame may be integrally formed with the loading table and the reinforcing walls of a plastic material. The loading table may include projecting portions projecting in the direction that extends the width of the loading table at side portions, on which the extensible rods are fixed, and the casters may be fixed to portions where the projecting portions are provided.

Furthermore, in the bag mounted with casters, a collapsible chair may be connected to the extensible rods. The collapsible chair may include a seat connected to the extensible rods so that one side portion of the seat can tiltaby and vertically move, a folding leg tiltably connected to a connecting portion of the seat, a support link connected to the folding leg so as to keep the seat in a horizontal position, and a connecting link restricting a tilted angle of the folding leg.

The stopper may include a projecting pin disposed at a lower end portion of the sliding rod so as to elastically project toward the guide tube, receiving portions provided on the guide tube so as to receive the projecting pin therein, and a disengagement mechanism for forcedly disengaging the projecting pin from the receiving portions. The disengagement mechanism may include a push button disposed on the grip, a drive rod installed inside the grip and the sliding rod so as to be vertically moved by the push button, and a pivot member pivoting so as to forcedly move the projecting pin inward by being pushed by the drive rod. The push button may be disposed on an upper surface of the grip.

DETAILED DESCRIPTION OF THE INVENTION

Figure 1:
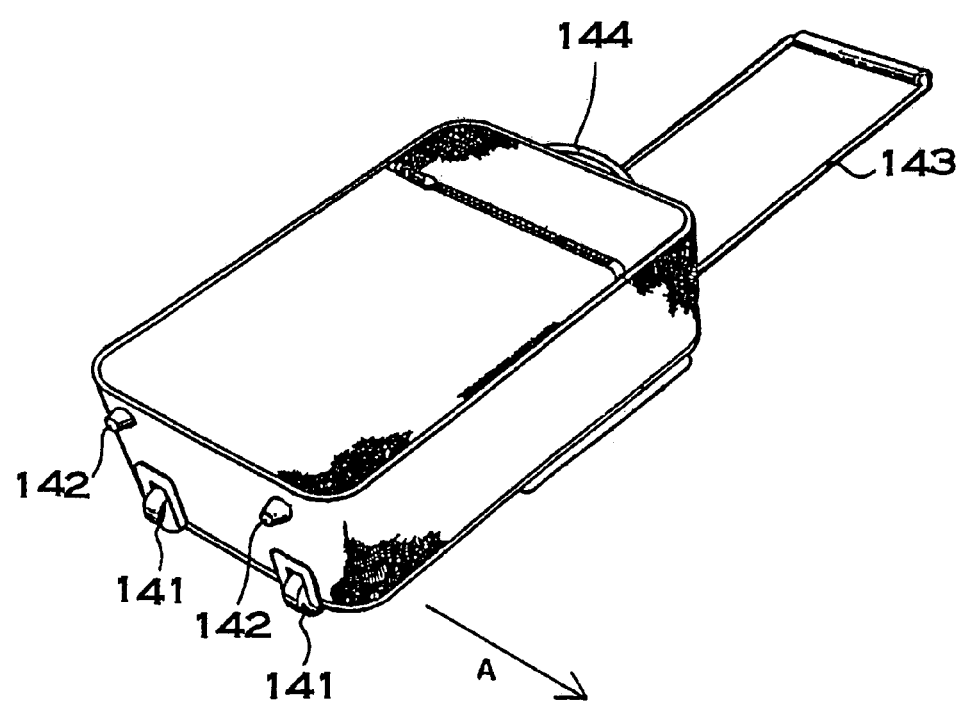
FIG. 1 shows a perspective view showing a conventional bag mounted with casters.
Figure 2:
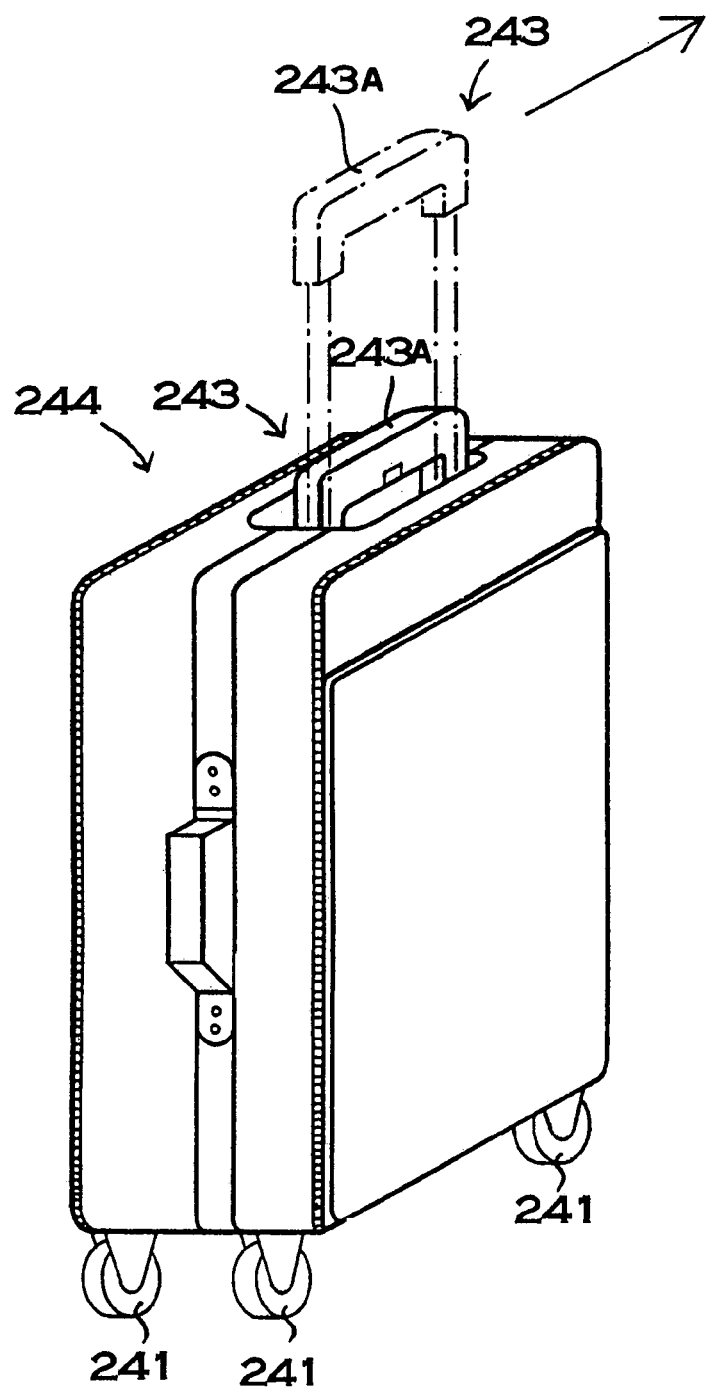
FIG. 2 is a perspective view of a bag developed by the present inventor in advance of the present invention.
Figure 3:
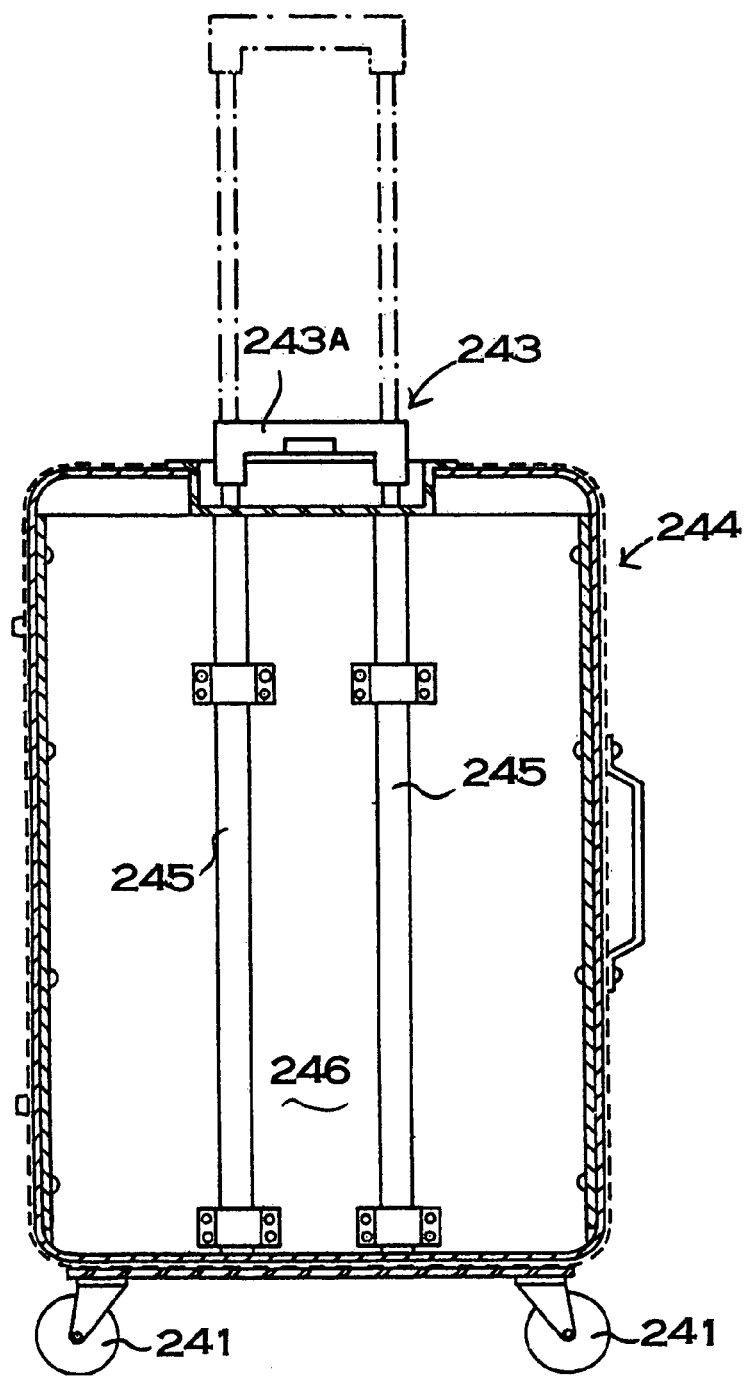
FIG. 3 is a vertical sectional view of another bag developed by the present inventor in advance of the present invention.
Figure 4:
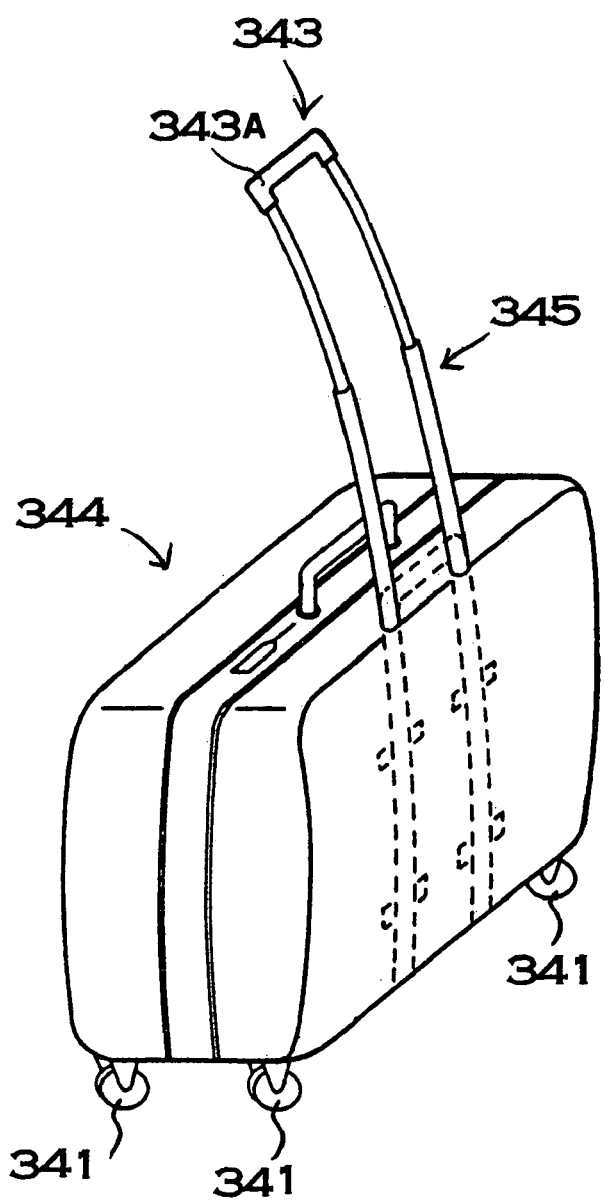
FIG. 4 is a perspective view of another bag developed by the present inventor in advance of the present invention.
Figure 5:
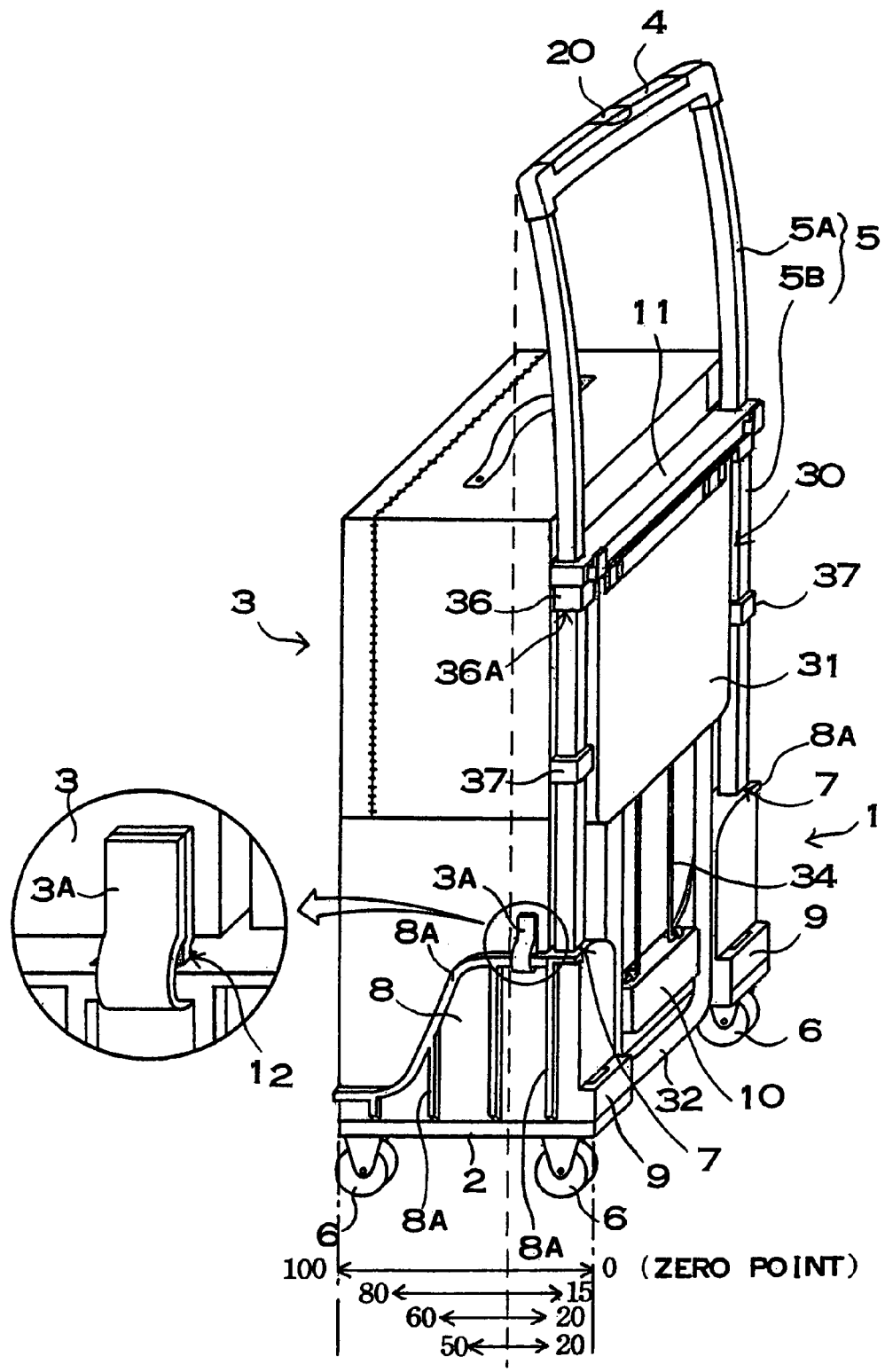
FIG. 5 is a perspective view of a bag mounted with casters according to one embodiment of the present invention, as viewed from the back thereof.
Figure 6:
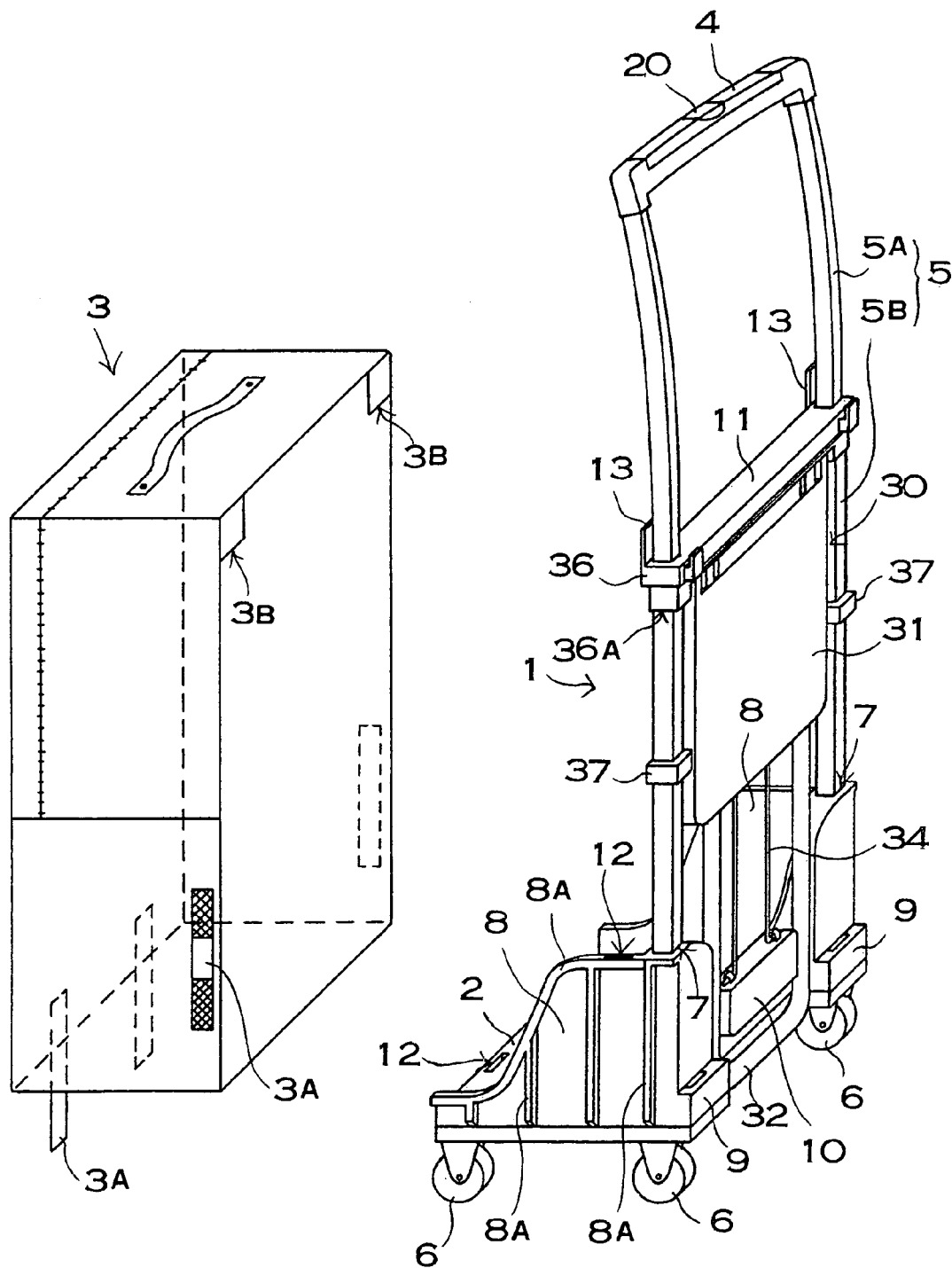
FIG. 6 is an exploded perspective view of the bag mounted with casters shown in FIG. 5, with a bag body being detached.

A bag mounted with casters shown in FIG. 5 and FIG. 6 comprises a base frame 1 mounted with the casters 6 capable of being freely moved on a horizontal plane in any moving direction mounted at four corners of a bottom surface of the base frame 1, and a bag body 3 attached to the base frame 1. As shown in the drawings, the bag body 3 is detachably attached to the base frame 3. The bag has the feature that the bag body 3 can easily be replaced. However, the bag body may be unremovably fixed to the base frame.

The base frame 1 is formed of a plastic material. The base frame 1 includes a loading table 2 mounted with the casters 6 at four corners of the loading table 2, extensible rods 5 upwardly extending from and fixed on one side of the loading table 2 so as to stand on their own, the extensible rods 5 having a grip 4 disposed on upper ends of extensible vertical rods 5, and a stopper 15 securing the extensible rods 5 at an extended position and a retracted position. A bag body 3 is fixed on side surfaces of the extensible rods 5 on or above the loading table 2.

The loading table 2 has a rectangular shape as its entire plane shape. The extensible rods 5 are fixed on one of longer edges of the rectangular shape of the loading table 2. Reinforcing walls 8 are disposed on shorter edges of the rectangular shape. The reinforcing walls 8 upwardly extend from the upper surface of the loading table 2. The reinforcing walls 8 become gradually higher toward the sides where the extensible rods 5 are fixed. The reinforcing walls 8 can connect the extensible rods 5 to be fixed by a more rigid structure. The reinforcing wall 8 has a planar inside surface and reinforcing ribs 8A integrally formed on an outside surface. A plurality of reinforcing ribs are arranged in the vertical direction, and a reinforcing rib is disposed along an upper edge as the reinforcing ribs 8A in the reinforcing wall 8. The reinforcing walls 8 achieve a light and rigid structure. Further, the reinforcing ribs 8A have a feature that can provide an aesthetic appearance.

Figure 7:
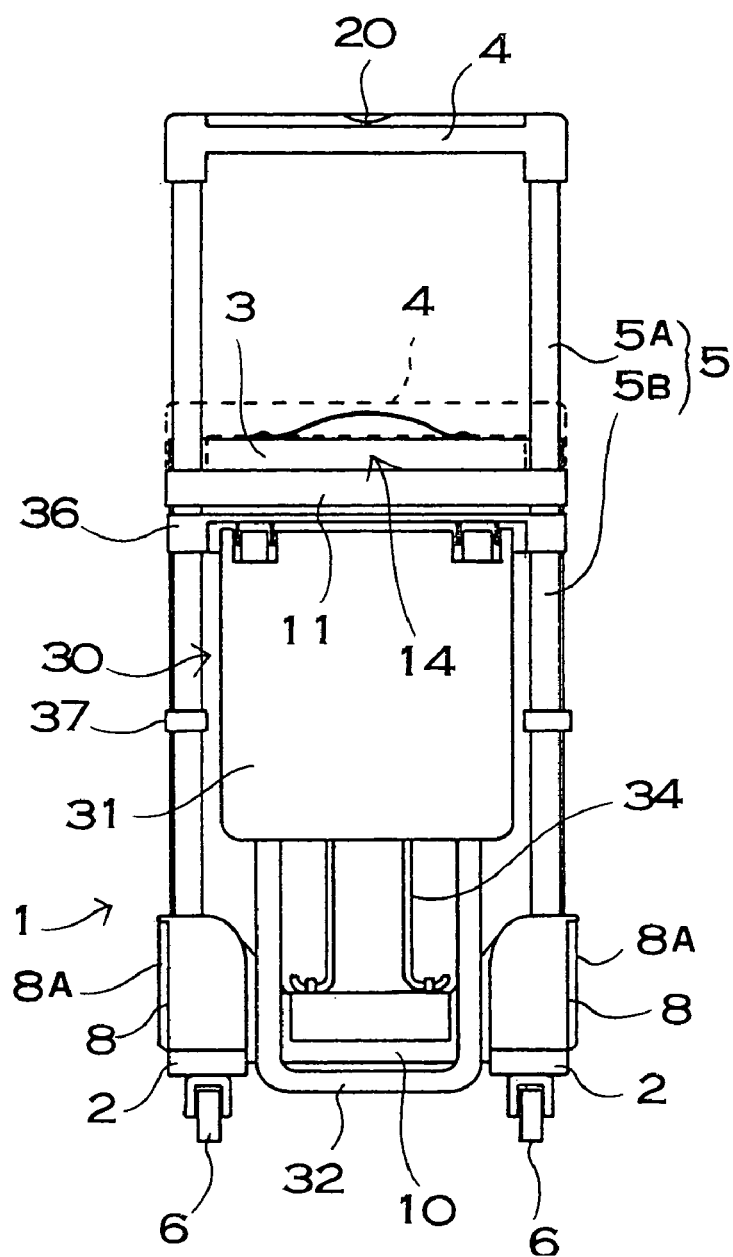
FIG. 7 is a perspective view of the bag mounted with casters shown in FIG. 5, as viewed from the back thereof.

The loading table 2 and the reinforcing walls 8 are integrally formed of a plastic material. The base frame 1, which is integrally formed with the loading table 2 and the reinforcing walls 8, can improve the strength of the connection between the loading table 2 and the reinforcing walls 8. However, in the bag according to the present invention, the loading table and the reinforcing walls may be separately formed of plastic, and fixed by an adhesive, screws, or the like. In the loading table 2 shown in the drawings, the reinforcing walls 8 disposed on both ends thereof are connected by a side wall 10. The side wall 10 is disposed on the side of connection of the extensible rods. The side wall 10 and the reinforcing walls 8 are connected so as to be orthogonal to each other. The side wall 10 is integrally formed with the reinforcing walls 8, and achieves reinforcement so that the reinforcing walls 8 do not fall down. As shown in FIG. 7, connection links 34 of a collapsible chair 30 are connected to the middle of the side wall 10. The reinforcing walls 8 have vertical holes connecting the extensible rods 5 inserted therein. The extensible rods 5 are inserted into and connected to the vertical holes 7. In the bag shown in the drawings, the extensible rods 5 have a square sectional shape, and thus, the vertical holes 7 also have a square sectional shape. The extensible rods 5 inserted into the vertical holes 7 are fixed by screws, the tips of which engage the extensible rods 5. However, the extensible rods 5 may be fixed in the vertical holes 7 by an adhesive, or may be connected to the vertical holes 7 by an unremovable fit structure. Such a structure connecting the extensible rods 5 to the loading table 2 can fix the extensible rods 5 to the loading table 2 in an extremely rigid structure.

The loading table 2 has a planar surface and reinforcing ribs (not shown), which extend longitudinally and laterally and are integrally formed on the lower surface thereof. The reinforcing ribs can allow the loading table 2 to be thin as a whole, and further achieve a rigid structure. In addition, through holes vertically penetrating the loading table may be provided among the reinforcing ribs arranged longitudinally and laterally in the loading table, thereby achieving weight reduction.

Further, the loading table 2 of FIG. 6 includes projecting portions 9 projecting in the direction that extends the width of the loading table 2 at side portions, on which the extensible rods 5 are fixed, i.e. the right side in FIG. 6, and the casters 6 are fixed to portions where the projecting portions 9 are provided. The loading table 2 with the projecting portions 9 can allow a wide spacing between the casters 6 fixed at both ends of the projecting portions 9, and provide stability. Although the loading table 2 of a rectangular shape with a narrow width tends to fall down, providing the projecting portions 9 allows a wide spacing between the casters 6 and can improve stability. The casters 6 are fixed at four corners of the loading table 2. Accordingly, the projecting portions 9 are provided at both ends on the side of connection of the extensible rods 5. The loading table 2 with the projecting portions 9 has a width of 14 to 16 cm, and a length of 20 to 35 cm. Besides, its width may be 12 to 35 cm.

The bag of the drawings holds the collapsible chair 30 between the projecting portions 9, and connects the collapsible chair 30 without increasing its width. The bag has a feature that can improve lateral stability by the projecting portions 9 and hold the collapsible chair 30 in the space formed by the projecting portions 9.

In the bag shown in the drawings, the bag body 3 is fixed on the side surfaces of the extensible rods (5) on or above the loading table 2. The bag body 3 can be made of a flexible sheet by sewing. The bag has a structure that can detachably attach the bag body 3. However, the bag body may be unremovably fixed to the base frame. Connecting holes 12 and the connecting hooks 13 are provided in the base frame 1 of FIG. 6, and the bag body 3 is detachably attached to the base frame 1. The connecting holes 12 are provided on the loading table 2 and the reinforcing walls 8. The loading table 2 has connecting holes 12 on the side opposite to the side of connection of the extensible rods. The loading table 2 has two of the connecting holes 12 penetrating vertically. The reinforcing walls 8 have the connecting holes 12 at a position close to the extensible rods 5 on the upper edge portions. The reinforcing wall 8 has the connecting hole 12 penetrating vertically through the reinforcing rib 8A. The connecting holes 12 of FIG. 6 have a slit shape. The bag body 3 is connected to the base frame 1 by inserting connecting bands 3A fixed to the bag body 3 into the connecting holes 12.

The connecting hooks 13 are connected to the extensible rods 5. In the bag of FIG. 6, the extensible rods 5 include guide tubes 5B, lower ends of which are connected to the loading table 2, and sliding rods 5A inserted into the guide tubes (5B) so as to be telescoping, and the connecting hooks 13 are provided on the connecting rods 11 connecting the upper ends of the guide tubes 5B. The connecting rod 11 is integrally formed with the connecting hooks 13 of a plastic material. The connecting hooks 13 upwardly extend. The connecting hooks 13 are inserted into connecting slits 3B provided on the bag body 3 and connect the bag body 3 so that the bag body 3 is not easily detached. The connecting hooks 13 are inserted into the connecting slits 3B provided on an upper portion of the bag body 3, and the connecting bands 3A provided on a lower portion of the bag body 3 are connected to the base frame 1, and thus, the bag body 3 is connected so that the bag body 3 is not detached. Connecting the connecting bands 3A to the base frame 1 prevents upward movement of the bag body 3. The connecting hooks 13 extending upwardly connect the bag body 3, which is prevented from moving upwardly, so that the bag body 3 is not detached.

The above connecting holes 12 and the connecting hooks 13 detachably, easily, and stably connect the bag body 3 to the base frame, so that the bag body 3 is not detached, as follows:

(1) Attaching the connecting hooks 13 to the connecting slits 3B of the bag body 3.

(2) Connecting the connecting bands 3A, which are connected to the lower portion of the bag body 3, to the connecting holes 12 provided on the loading table 2 and the reinforcing walls 8 of the base frame 1, in this state. One end of the connecting bands 3A are fixed on the bag body 3 by sewing, or are connected by an adhesive. Detachable connecting members are provided at free ends of the connecting bands 3A. The detachable connecting member can be a button, a hook, a clasp, a VELCRO fastener (registered trademark), or the like.

To remove the bag body, the connecting bands 3A are detached, and then the bag body 3 is moved upwardly so as to disengage the bag body 3 from the connecting hooks 13 in inverse order of attachment of the bag body 3. Connecting the lower portion and the upper portion of the above bag body 3 to the base frame 1 and the connecting hooks 13 respectively can provide easy and stable attachment and detachment of the bag body 3 to the base frame 1. The bag body may be attached by connecting both upper and lower portions of the bag body to the base frame by the connecting bands without the use of the connecting hooks.

As shown in FIG. 5, the extensible rods 5 are curved so that the grip 4 moves from the one side of the loading table 2, on which the extensible rods 5 are fixed, toward the middle of the loading table 2 when the grip 4 is raised by extending the extensible rods 5. In the case that the extensible rods 5 are fixed on the right side of the loading table 2 as shown in FIG. 5, the middle of the loading table 2 is defined as the center of the right and left direction of the loading table 2. In the bag shown in FIG. 5, since the extensible rods 5 are fixed on the right side of the loading table 2, the extensible rods 5 are curved so that the grip 4 moves from the right side to the left side of the loading table 2 when the extensible rods 5 are raised. In other words, the middle portions of the extensible rods 5 are shaped as an arc and outwardly project so as to move the raised grip 4 in the direction approaching the center from the side portion of the loading table 2. Besides, it is not always necessary that the grip 4 is positioned at the center of the loading table 2 in the state in which that the extensible rods 5 are raised. The reason is that the bag can be moved by pushing the grip 4 without winding even when the grip 4 is not positioned at the right center. In FIG. 5, a position where the grip 4 is raised is in a range of 15 to 80% for example, and preferably 20 to 60%, more preferably 20 to 50% when an end surface of the one side on which the extensible rods 5 are fixed, is defined as a zero point, and an end surface of the opposite side is defined 100.

Figure 8:
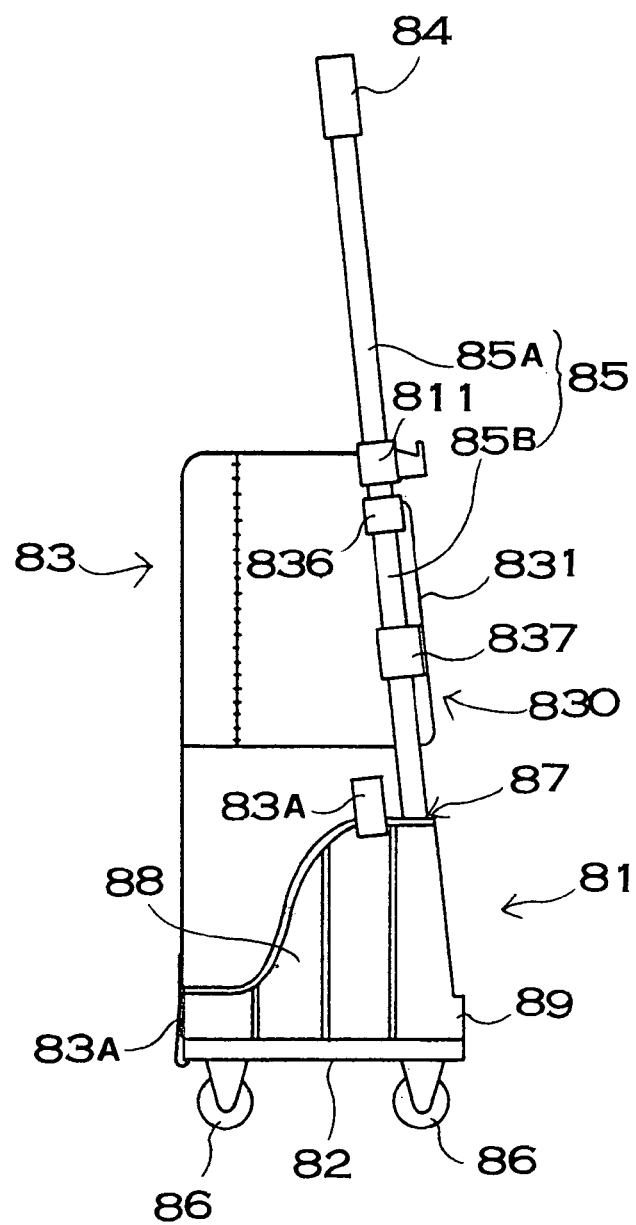
FIG. 8 is a side view of a bag mounted with casters according to another embodiment of the present invention.

Further, in the bag of FIG. 8, the extensible rods 85 are tilted and fixed to the loading table 82 so that the grip 84 moves from the one side of the loading table 82, on which the extensible rods 85 are fixed, toward the middle of the loading table 82 when the grip 84 is raised by extending the extensible rods 85. In the bag of FIG. 8, since the extensible rods 85 are fixed on the right side of the loading table 82, the extensible rods 85 are tilted so that the grip 84 moves from the right side to the left side of the loading table 82 when the extensible rods 85 are raised. Similarly to the curved extensible rods 5, in tilted extensible rods 85, it is not always necessary that the grip 84 is positioned at the middle of the loading table 2 in the state that the grip 84 is raised. The reason is that the bag can be moved by pushing the grip 84 without winding even when the grip 84 is not positioned at the right center.

Besides, in the embodiment shown in FIG. 8, components same as or similar to those of the aforementioned embodiment are attached with numerals with the same last digit(s) of reference numerals except the first one digit of numerals, and their description is omitted.

In addition, although not illustrated, the bag may include curved extensible rods, which are tilted and fixed on one side of the loading table, so that the grip is moved from the one side toward the middle of the loading table when the grip is raised. In this bag, the grip can be moved so as to approach the middle of the loading table when raised, even when a radius of curvature is greater, and the angle of inclination is closer to a right angle. The reason is that both inclination and curvature can allow the raised grip to move from the side portion to the middle of the loading table.

Stoppers 15 secure the extensible rods 5 so that the grip 4 is positioned at the upper portion of, or above the bag body 3 in a retracted state, i.e., in the state in which the grip 4 is fully pushed down. The extensible rods 5 are designed so that the height of the upper surface of the grip from the bottoms of the casters 6 is approximately 50 cm when the extensible rods 5 are fully retracted so that the grip 4 is positioned at the lowest position. However, the extensible rods 5 may be designed so that the height of the upper surface of the grip from the bottoms of the casters 6 is preferably in a range of 30 to 80 cm, more preferably 35 to 75 cm when the extensible rods 5 are fully retracted so that the grip 4 is positioned at the lowest position. For ease of gripping the grip 4, the bag body 3 is designed to be lower than the grip 4 in the state that the grip 4 is positioned at the lowest position by retracting the extensible rods 5. The stopper 15 secures the extensible rod 5 at a position where the height of the center of the grip 4 from the bottoms of the casters 6 is in a range of 60 to 100 cm, preferably 65 to 85 cm in an extended state, i.e., in the state that the grip 4 is fully raised.

The extensible rods 5 include guide tubes 5B, which vertically extend from and are fixed on the loading table 2, and sliding rods 5A, which are inserted into the guide tubes 5B, and are thereby telescoping, and the grip 4 is fixed at the upper ends of the sliding rods 5A. The guide tube 5B and the sliding rod 5A can be metal tubes with different sizes from each other. However, the guide tube and the sliding rod may be tubes with a square section formed of a plastic material.

In the bag shown in the drawings, the two extensible rods 5 are fixed on the one end of the loading table 2, and the grip 4 is connected to the upper ends of the two extensible rods 5. In addition, in the bag shown in the drawings, the two extensible rods 4 are located and fixed at both ends of the one side of the loading table 2. In other words, the space between the two extensible rods 4 is designed to be substantially equal to the length of the longer edge of the loading table 2 with a rectangular shape. Thus, a structure fixing the two the extensible rods 5 at both ends of the loading table 2 has a feature that can allow the extensible rods 5 to stand on their own in a more rigid structure. The reason is that a frame of the rectangular shape defined by the two extensible rods 5 and the grip 4 can be larger. This structure can extremely reduce the force acting in the direction that pushes the extensible rods 4 down by pushing the grip 4 toward the moving direction of the bag in the state that the bag with the extended extensible rods 5 is moved. Accordingly, even when a user walks while gripping the grip 4, or when a user uses the bag as a walking stick to move by pushing the bag, it is possible to stably move the bag while preventing the extended extensible rods 5 from falling down. Additionally, load applied on a connection portion between the extensible rods 5 and the loading table 2 can be extremely reduced. Therefore, the structure has a feature that can effectively prevent damage to this portion.

Further, the structure fixing the two extensible rods 5 at both ends of the longer edge of the loading table 2 fixes the extensible rods 5 at an end portion of the front side and an end portion of the rear side in the moving direction of the loading table 2 that the bag is moved with the casters 6. Accordingly, the force acts on the extensible rod 5 of the front side in the direction that the loading table 2 is pulled, and the force acts on the extensible rod 5 of the rear side in the direction that the loading table 2 is pushed. Thus, it is possible to lightly and smoothly move the loading table 2. Especially, this structure can provide excellent directivity of the loading table 2 for steering during the movement. Therefore, this structure can achieve a feature that stably moves the loading table 2 mounted with casters 6 capable of being freely moved on a horizontal plane in any moving direction mounted at four corners of bottom surface thereof with excellent directivity.

Furthermore, the connecting rod 11 is connected between the upper ends of guide tubes 5B. The lower ends of the guide tubes 5B are fixed to the loading table 2, and the upper end portions are connected to the connecting rod 11. Thus, a structure connecting the connecting rod 11 at the upper ends of the guide tubes 5B can reinforce the two extensible rods 5 and allow the two extensible rods 5 to more stably stand on their own. An insertion clearance 14 for insertion of the user's hands is provided between the connecting rod 11 and the grip 4 when lowered at the lowest position shown by a dashed line. This is for ease of gripping the lowered grip 4. The grip 4 shown in the drawings is formed of plastic in a U-shape as a whole, and both ends of the bent portions are connected to the sliding rods 5A, thus providing the insertion clearance 12.

Figure 9:
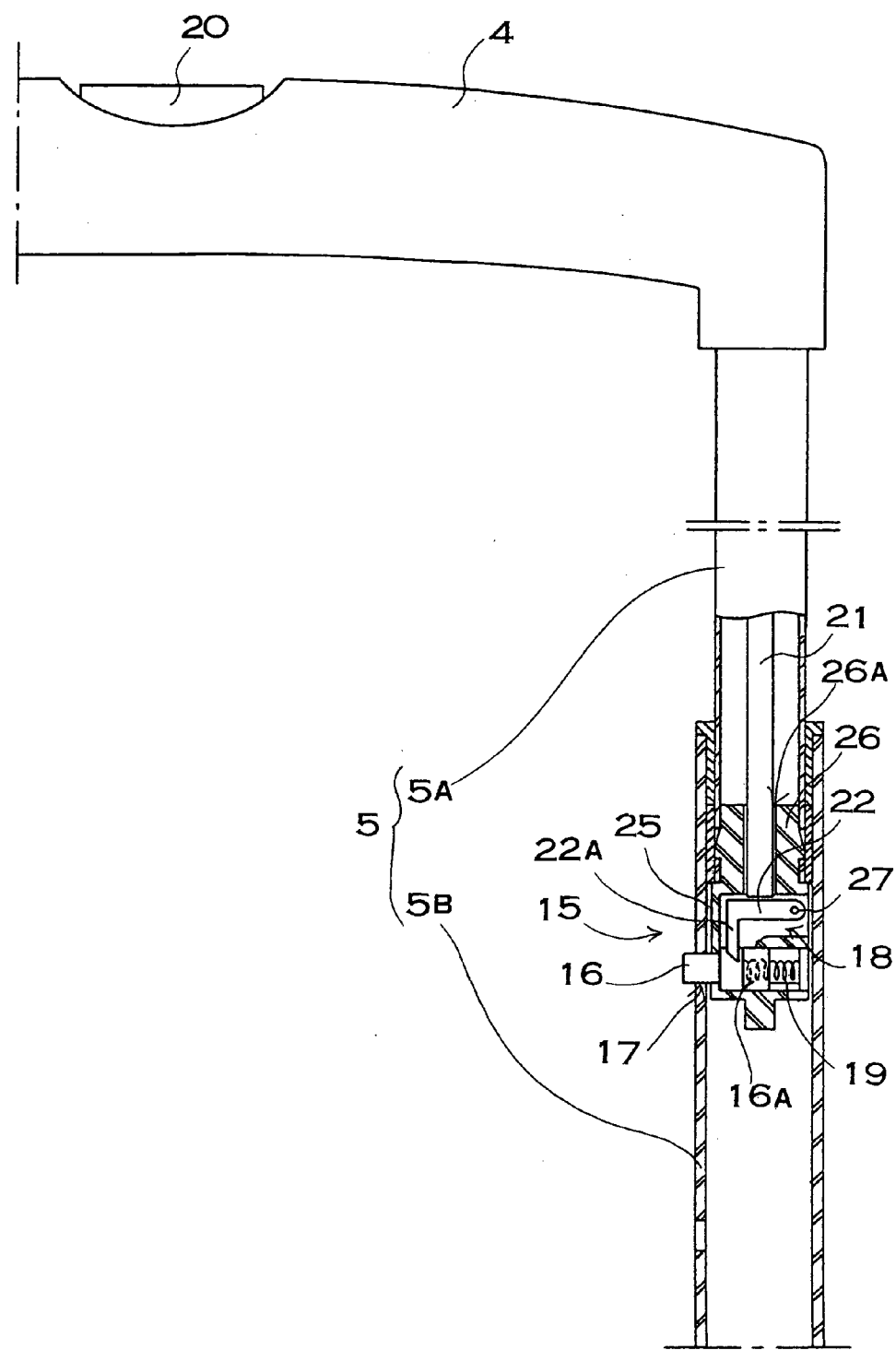
FIG. 9 is an enlarged sectional view showing a structure of a stopper of an extensible rod.
Figure 10:
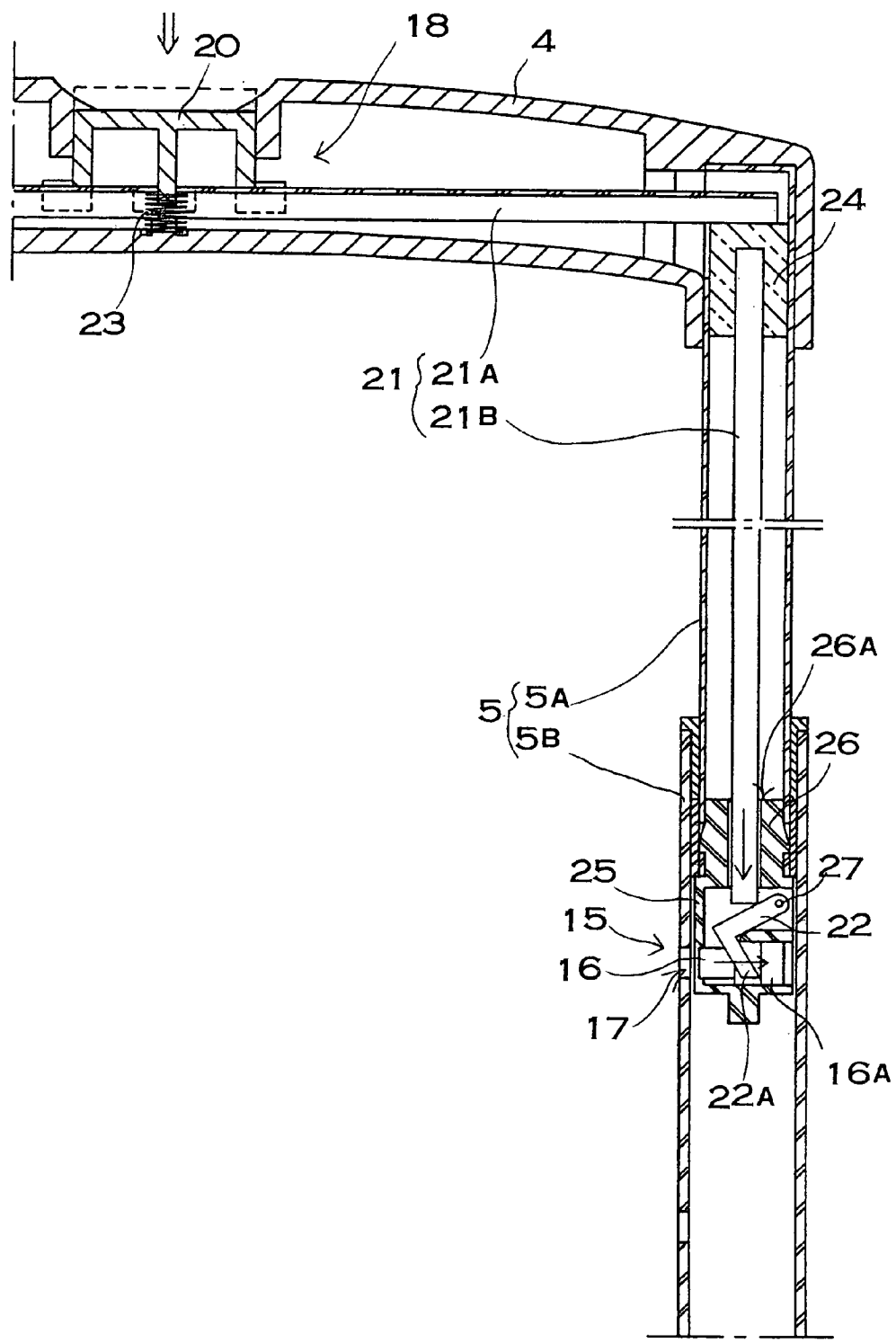
FIG. 10 is an enlarged sectional view showing a state, in which the stopper of the extensible rod shown in FIG. 9, is disengaged.

Any mechanism capable of securing the extensible rod 5 can be used as the stopper 15. One example of the stopper 15 is shown in FIG. 9 and FIG. 10. The stopper shown in these drawings includes a projecting pin 16 disposed at a lower end portion of the sliding rod 5A so as to elastically project toward the guide tube 5B, receiving portions 17 provided on the guide tube 5B so as to receive the projecting pin 16 therein, and a disengagement mechanism 18 for forcedly disengaging the projecting pin 16 from the receiving portions 17.

The projecting pin 16 is attached to the lower end portion of the sliding rod 5A through an elastic member 19 so as to elastically project toward the guide tube 5B. The projecting pin 16 elastically projects from the sliding rod 5A by being thrust by the elastic member 19. The receiving portion 17 is a through hole or a recessed portion into which the projecting pin 16 is inserted. The guide tube 5B shown in the drawings has a through hole opening therein, into which the projecting pin 16 is inserted, as the receiving portion 17. A structure with the through hole as the receiving portion 17 has a feature that the extensible rod 5 is secured by projecting the projecting pin 16 outwardly of the guide tube 5B from the through hole. This can provide extreme safety in use of the extensible rods 5 instead of a walking stick, in other words, when a user leans on the grip 4 to support his or her weight. The reason is that the extensible rods 5 can be effectively prevented from being pushed down due to unintentional disengagement of the projecting pin 16 from the receiving portion 17. In addition, the structure has another feature that can prevent the extensible rods 5 from extending unintentionally when the whole bag is lifted by gripping the grip 4. Thus, the stopper 15 is capable of surely securing the position of the sliding rod 5A and provides extreme safety when the grip 4 is in the raised position and the lowered position. However, the receiving portion may be a recessed portion into which a tip of the projecting pin is inserted.

Although not illustrated, the receiving portions 17 provided on the guide tube 5B are disposed at the positions corresponding to locations of the projecting pin 16 when the sliding rods 5A are fully raised, raised in the middle, and fully lowered. Extension and retraction of the extensible rods 5 stop by inserting the projecting pin 16 into the highest receiving portion 17 when the sliding rods 5A are fully raised, by inserting the projecting pin 16 into the lowest receiving portion 17 when the sliding rods 5A are fully lowered, and by inserting the projecting pin 16 into the middle receiving portion 17 when the sliding rods 5A are raised in the middle. Thus, the extensible rods 5 can extend and retract the sliding rods 5A in multi steps. However, the extensible rods do not necessarily have a structure capable of stopping at the middle position. They may stop only at the raised position and the lowered position. Additionally, a plurality of receiving portions 17 may be arranged in the middle of the guide tube 5B so that the sliding rod 5A raised in the middle can be stopped at a plurality of raised positions. The user can select the most suitable position of the grip 4 by moving the grip vertically in small steps.

The disengagement mechanism 18 includes a push button 20 disposed on the grip 4, a drive rod 21 installed inside the grip 4 and the sliding rod 5A so as to be vertically movable by operation of the push button 20, and a pivot member 22 which can pivot to forcedly move the projecting pin 16 when pushed by the drive rod 21.

The push button 20 is provided in the middle portion of an upper surface of the grip 4 so as to move vertically. The push button 20 is connected to a lower surface of the grip 4 through an elastic member 23, and is elastically thrust through the elastic body 23. A lower surface of the push button 20 is connected to the drive rod 21, and drives the drive rod 21 vertically when the push button 20 is moved by the user's finger(s) or thumb.

The drive rod 21 is disposed inside the grip 4 and the sliding rod 5A, and is driven to pivotally move the pivot member 22 by the push button 20. The drive rod 21 shown in the drawings includes a horizontal rod 21A connected to the lower surface of the grip 4, and vertical rods 21B inserted through the sliding rods 5A. Both ends of the horizontal rod 21A are located at positions above upper ends of the vertical rods 21B so as to push the vertical rods 21B downward when the horizontal rod 21A is thrust downwardly. Insertion caps 24, which vertically move inside the sliding rods 5A, are inserted into the upper ends of the vertical rods 21B, and thus, the vertical rods 21B can accurately move inside the sliding rods 5A in the vertical direction. However, both ends of the horizontal rod may be connected to the upper ends of the vertical rods. For example, the drive rod may be one rod bent in a U-shape. Lower ends of the drive rods 21 extend to the lower ends of the sliding rods 5A.

The pivot members 22 are connected to the lower ends of the sliding rods 5A, and pivot in the direction that forcedly moves the projecting pins 16 inwardly when pushed by the lower ends of the drive rods 21. The lower end of the sliding rod 5A shown in the drawings is connected to the guide cap 25. The pivot member 22 is attached inside the guide cap 25 so as to pivot on the vertical plane. The guide cap 25 has a connecting cylindrical portion 26 inserted into the sliding rod 5A, and an opening insertion hole 26A, which the drive rod 21 is inserted through, in the connecting cylindrical portion 26, so that the lower portion of the drive rod 21 can accurately move in the vertical direction. One end of the pivot member 22 is connected to the guide cap 25 via a pivot shaft 27, and a pin 22A projecting toward the projecting pin 16 is located at both sides of another end. When the pivot member 22 pivots by operation of the drive rod 21, a tip of the pin 22 contacts the projecting portions 16A provided on both sides of the projecting pin 16, and then the pivoting pin 22A thrusts the projecting pin 16 so as to forcedly move the projecting pin 16 backward. When thrust of the drive rod 21 is released, the projecting pin 16 is not thrust by the pin 22A of the pivot member 22, and thus, the pivot member 22 pivots to a rest position by being elastically pushed by the elastic member 19.

In the above disengagement mechanism 18, when the push button 20 is pushed, the drive rod 21 is pushed down, and the pivot members 22, which are provided on the lower ends of the drive rod 21, pivot. The pivot member 22 moving pivotally moves the projecting pin 16 in the direction that the projecting pin 16 is released by the tip of the pin 22A, and releases the projecting pin 16 from the receiving portion 17. In this state, the stopper 15 is disengaged, and the sliding rod 5A can vertically move inside the guide tube 5B. When the push button 20 is released, the projecting pin 16 moves so that the projecting pin 16 projects toward the guide tube 5B by being thrust by the elastic member 16.

In the stopper 15, pushing the push button 20 of the disengagement mechanism 18 provided on the grip forcedly moves the projecting pin 16 inward, and thus, the stopper 15 is disengaged. The sliding rod 5A can be raised or lowered in the state of disengagement of the stopper 15. The sliding rod 5A with the projecting pin 16 pulled therein can vertically move inside of the guide tube 5B. After the push button 20 is released, when the grip 4 is adjusted to a predetermined height, the projecting pin 16 is led to one of the receiving portions 17, and thus, the extension and retraction of the extensible rod 5 is stopped. Accordingly, upward and downward movement of the grip 4 also stops.

The stopper 15 of the above structure has a simple structure and can secure the extensible rod 5 at the predetermined positions. However, in the bag according to the present invention, the stopper is not specifically limited to the above structure. Any mechanism capable of securing the extensible rods at a predetermined position can be used as the stopper.

Further, in the bag of FIG. 5, the collapsible chair 30 is connected to the extensible rods 5. In the bag with the collapsible chair 30, a user can sit on the unfolded chair during a wait or when he or she is tired. Especially, the bag according to the present invention can be used as a walking stick when a user moves in the state where the grip 4 is raised, and therefore, the bag with the collapsible chair 30 attached thereto has a feature that can provide comfort for the user in both cases when the user moves and does not move.

In the bag shown in the drawings, the collapsible chair 30 is provided inside the projecting portions 9 of the loading table 2. Accordingly, the collapsible chair 30 is designed not to project from the projecting portions 9 when folded, thus the chair can be provided without increasing the width of the bag as a whole. The collapsible chair 30 includes a seat 31 which is unfolded in use, a folding leg 32 which supports the seat 31 stably when unfolded, a support link 33 which supports the seat 31 in a horizontal position, and connecting links 34 which support the folding leg 32 at a predetermined angle.

The seat 31 is connected to the extensible rods 5 so that one of side portions of the seat 31 can be tiltably and vertically moved. The seat 31 is integrally formed of plastic with a peripheral wall 35 projecting downwardly along both sides and a front end of the seat 31. First notch portions 35A and snap notch portions 35B guiding the folding leg 32 and the connecting links 34 in a folded state respectively are provided on the peripheral wall 35. The snap notch portion guides the connecting link 34 with a snap, and can hold the collapsible chair 30 in a folded state. The reason is that the folding leg 32 and the seat 31, which are folded in a position parallel to the extensible rods 5, cannot be unfolded until the connecting links 34 are disengaged from the snap notch portions 35B.

The seat 31 is tiltably connected to a vertically movable base 36 which is movable vertically along the extensible rods 5. Both ends of the vertically movable base 36 are slidably connected to the guide tubes 5B of the extensible rods 5. The guide tube 5B is a tube of a square section, and thus, through holes 36A of a square section are provided at the both ends of the vertically moveable base 36. The guide tubes 5B are slidably inserted into the through holes 36A. When the collapsible chair 30 is folded and unfolded, the vertically movable base 36 vertically moves along the guide tubes 5B of the extensible rods 5 in a horizontal position. In addition, stopper tubular members 37, which function to stop downward movement of the vertically movable base 36, are fixed on the extensible rods 5. Contact of the vertically movable base 36 with the stopper tubular member 37 stops downward movement of the vertically movable base 36.

The folding leg 32 is a metal pipe bent in a U-shape, and both of its ends are tiltably connected to the vertically movable base 36, which is a connecting portion of the seat 1. The folding leg 32 is folded and unfolded in the direction that the folding leg 32 is tilted relative to the extensible rods 5. When the folding leg 32 is unfolded, its lower end is spaced from the extensible rods 5, and thus, the unfolded folding leg 32 and the extensible rods 5 can stably support the seat 31. In the unfolded state, the folding leg 32 supports the extensible rods 5 in a substantially vertical position.

Figure 11:
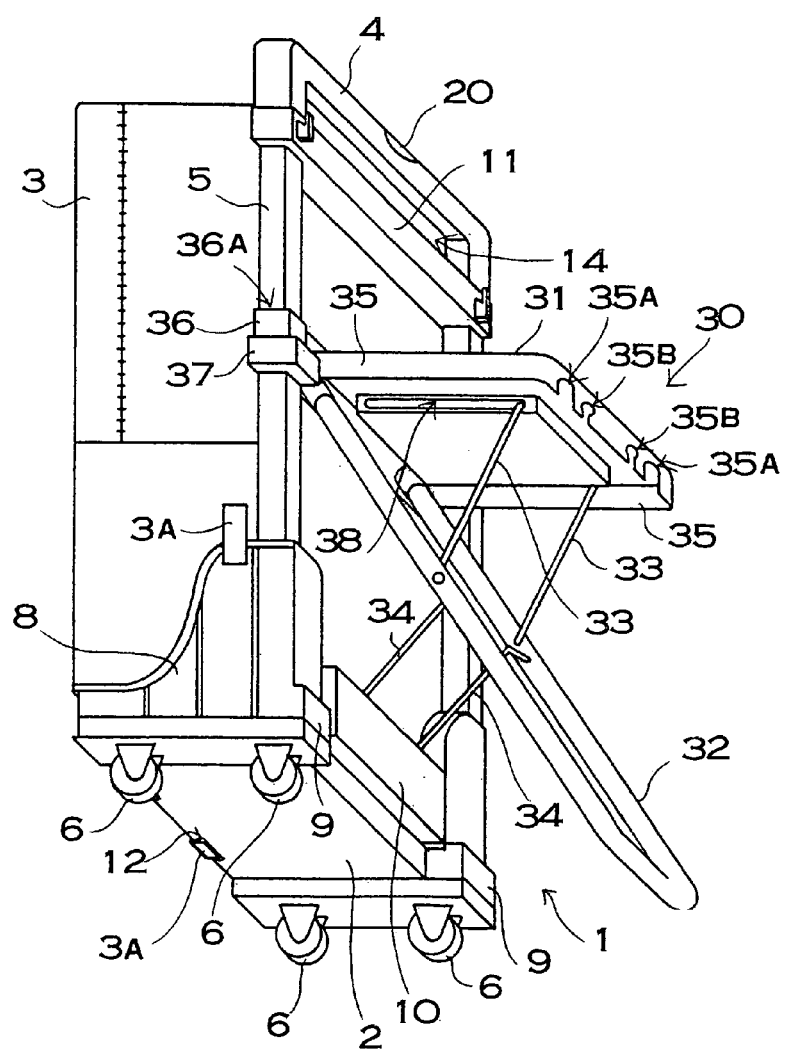
FIG. 11 is a perspective view showing a state, in which a collapsible chair of the bag shown in FIG. 5, is unfolded.

The support link 33 is connected to the folding leg 32 so that its lower ends can pivot, and maintain the seat 31 in a horizontal position. The support link 33 is a metal rod having a U-shape formed by bending. Both of its ends are titably connected to the folding leg 32. Slits 38 are provided on a lower surface of the seat 31. A horizontal portion in the middle of the metal rod slidably moves along the slits 38. As the seat 31 is unfolded relative to the folding leg 32, the horizontal portion of the support link 33 slidably moves along the slits 38 of the seat 31. As shown in FIG. 11, the support link 33 in a tilt position to the front side of the seat 31 supports the seat 31 in a horizontal position. As the seat 31 is folded, the horizontal portion of the support link 33 slidably moves along the slits 38 backwardly of the seat, i.e., the left side in FIG. 11.

The connecting links 34 are two rods. The first ends and the second ends of the connecting links 34 are tiltably connected to the folding leg 32 and the loading table 2, respectively. In the bag shown in the drawings, the connecting links 34 are tiltably connected to an upper surface of the side wall 10 provided on the loading table 2. The connecting links 34 are connected to the middle leg portions of the folding leg, and restrict a tilted angle of the folding leg 32 to a predetermined angle. The folding leg 32 is tilted while the vertically movable base 36 is lowered. As the vertically movable base 36 is lowered, the tilted angle of the folding leg 32 is getting greater. Contact of the vertically movable base 36 with the stopper tubular member 37 stops the downward movement of the vertically movable base 36. In this state, the connecting links 34 stop the folding leg 32 from being further tilted.

The collapsible chair of this structure is folded and unfolded upon the actions as follows.

Folded State:

The vertically movable base 36 is positioned at a raised position. The seat 31 and the folding leg 32 are folded in a position parallel to the extensible rods 5. The folding leg 32 is guided to the first notch portions 35A of the seat 31. The connecting links 34 are guided to the snap notch portions 35B of the seat 31. The support link 33 is also folded in parallel to the extensible rods 5. The collapsible chair 30 is in this state of a position parallel to the extensible rods 5, when the bag moves with the casters 6, or when the collapsible chair 30 is not in use. The connecting links 34 are guided to the snap notch portions 35B of the seat 31, and thus, the collapsible chair 30 is held in a folded state.

Unfolding Collapsible Chair:

Initially, the connecting links 34 are released from the snap notch portions 35B of the seat 31. The vertically movable base 36 is lowered to unfold the seat 31 and the folding leg 32. Then, the vertically movable base 36 is lowered until it contacts the stopper tubular members 37, and s is stopped at this position. In this state, the connecting links 34 stop the folding leg 32 from being further tilted. The support link 33 is tilted to forwardly move the horizontal portion thereof along the slits 38 of the seat 31. Then, the support link 33 is stopped at the most forward position of the slits 38 of the seat 31. In this state, the seat 31 is supported in a horizontal or substantially horizontal position by the support link 33.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims, or the equivalence of such metes and bounds thereof are therefore intended to be embraced by the claims.

This application is based on application No. 2003-144194 filed in Japan on May 21, 2003, the content of which is incorporated hereinto by reference.

What is claimed is:

1. A mobile bag comprising:
   a base frame including a rectangular loading table, reinforcing walls extending perpendicularly from the short ends of the rectangular loading table, a plurality of casters mounted on a lower surface of the rectangular loading table to permit free movement on a horizontal plane in any moving direction, extensible rods upwardly extending from one side of the rectangular loading table and fixed to the reinforcing walls, respectively, so as to stand on their own, and stoppers securing the extensible rods at an extended position and a retracted position,
   wherein the extensible rods have a grip disposed on upper ends thereof, and the casters are mounted near the four corners of the rectangular loading table; and a bag body fixed on side surfaces of the extensible rods on or above the rectangular loading table, wherein:

the extensible rods are shaped so that the grip moves from the one side of the rectangular loading table, on which the extensible rods are fixed, toward the middle of the loading table as the grip is raised by extending the extensible rods, the extensible rods are secured in a retracted state by the stoppers so that the grip is positioned at an upper portion of the bag body or above the bag body, and the extensible rods are secured in an extended state by the stoppers so that a height of the grip from the bottoms of the casters is in a range of 60 to 100 cm, and the rectangular loading table is reinforced by the reinforcing walls which stand substantially perpendicular to the surface of the loading table and adjacent to the extensible rods.

2. The mobile bag according to claim 1 wherein the extensible rods are curved so that the grip moves from the one side of the loading table, on which the extensible rods are fixed, toward the middle of the loading table as the grip is raised by extending the extensible rods.

3. The mobile bag according to claim 1 wherein the extensible rods are connected to the loading table so as to be tilted so that the grip moves from the one side of the loading table, on which the extensible rods are fixed, toward the middle of the loading table as the grip is raised by extending the extensible rods.

4. The mobile bag according to claim 1 wherein, when the extensible rods are fully extended, the grip is positioned over the loading table in a range of 15 to 80% when an end surface of the one side on which the extensible rods are fixed, is defined as a zero point, and an end surface of the opposite side is defined 100%.

5. The mobile bag according to claim 1 wherein, when the extensible rods are fully extended, the grip is located in a position over the loading table in a range of 20 to 60% when an end surface of the one side on which the extensible rods are fixed, is defined as a zero point, and an end surface of the opposite side is defined 100%.

6. The mobile bag according to claim 1 wherein, when the extensible rods are fully extended, the grip is located in a position over the loading table in a range of 20 to 50% when an end surface of the one side on which the extensible rods are fixed, is defined as a zero point, and an end surface of the opposite side is defined 100%.

7. The mobile bag according to claim 1 wherein the bag body is made of a flexible sheet by sewing, and the bag body is detachably attached to the base frame.

8. The mobile bag according to claim 1 wherein the extensible rods include guide tubes, which vertically extend from and are fixed on the loading table, and sliding rods, which are inserted into the guide tubes so as to be telescoping, and the grip is fixed at upper ends of the sliding rods.

9. The mobile bag according to claim 8 wherein the stopper includes a projecting pin disposed at a lower end portion of the sliding rod so as to elastically project toward the guide tube, receiving portions provided on the guide tube for receiving the projecting pin therein, and a disengagement mechanism for forcedly disengaging the projecting pin from the receiving portions.

10. The mobile bag according to claim 9 wherein the disengagement mechanism includes a push button disposed on the grip, a drive rod installed inside the grip and the sliding rod so as to be vertically movable by operation of the push button, and a pivot member for forcedly moving the projecting pin inward upon being pushed by the drive rod.

11. The mobile bag according to claim 10 wherein the push button is disposed on an upper surface of the grip.

12. The mobile bag according to claim 1 wherein two extensible rods are fixed on the one side of the loading table, and the grip is connected to the upper ends of the two extensible rods.

13. The mobile bag according to claim 12 wherein each of the two extensible rods includes a guide tube and a sliding rod, and a connecting rod is connected between upper ends of the guide tubes.

14. The mobile bag according to claim 13 wherein the two extensible rods are fixed at both end portions of the one side of the loading table.

15. The mobile bag according to claim 1 wherein the bag body is attached to an area surrounded by the reinforcing walls and the extensible rods.

16. The mobile bag according to claim 15 wherein the base frame is integrally formed with the loading table and the reinforcing walls of a plastic material.

17. The bag mounted with casters according to claim 1 wherein the loading table includes projecting portions projecting in the direction that extends along the width of the loading table at side portions thereof on which the extensible rods are fixed, wherein two of the casters are fixed to portions where the projecting portions are provided.

18. The mobile bag according to claim 1 wherein a collapsible chair is connected to the extensible rods.

19. The mobile bag according to claim 18 wherein the collapsible chair includes a seat connected to the extensible rods so that one side portion of the seat can tiltaby and vertically move, a folding leg tiltably connected to a connecting portion of the seat, a support link connected to the folding leg so as to keep the seat in a horizontal position, and a connecting link for restricting a tilted angle of the folding leg.

20. The mobile bag according to claim 1 wherein the reinforcing walls increase in height in a direction toward the extensible rods to provide a more rigid structure.

* * * * *